United States Patent
Vorndran et al.

(10) Patent No.: US 6,542,803 B1
(45) Date of Patent: Apr. 1, 2003

(54) METHOD FOR DETERMINING ADJUSTING SPEEDS IN A CONTINUOUSLY VARIABLE TRANSMISSION

(75) Inventors: Ralf Vorndran, Eriskirch (DE); Wolfgang Danz, Friedrichshafen (DE); Friedrich Reiter, Kressbronn (DE); Andreas Piepenbrink, Meersburg (DE); Andreas Schwenger, Friedrichshafen (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/914,121

(22) PCT Filed: Feb. 21, 2000

(86) PCT No.: PCT/EP00/01402

§ 371 (c)(1),
(2), (4) Date: Aug. 23, 2001

(87) PCT Pub. No.: WO00/50786

PCT Pub. Date: Aug. 31, 2000

(30) Foreign Application Priority Data

Feb. 25, 1999 (DE) .......................... 199 08 251

(51) Int. Cl.[7] .......................... F16H 61/00; G06F 17/00
(52) U.S. Cl. .......................... 701/51; 701/60; 701/68
(58) Field of Search .......................... 701/51, 53, 54, 701/55, 60, 61; 474/18, 28, 69

(56) References Cited

U.S. PATENT DOCUMENTS

| 5,012,697 A | 5/1991 | Yamashita et al. ............ 74/866 |
|---|---|---|
| 5,020,392 A | 6/1991 | Morimoto .................... 74/866 |
| 5,257,960 A | 11/1993 | Sato ............................ 474/69 |
| 5,720,692 A | 2/1998 | Kashiwabara ................ 477/45 |
| 5,803,862 A | 9/1998 | Ochiai et al. ................. 477/45 |
| 5,906,649 A | 5/1999 | Genzel et al. ................ 477/46 |
| 5,947,862 A | 9/1999 | Knapp et al. ................ 477/46 |
| 5,967,918 A | * 10/1999 | Knapp et al. .............. 318/491 |

FOREIGN PATENT DOCUMENTS

| DE | 195 27 412 A1 | 1/1997 | .......... F16H/59/06 |
|---|---|---|---|
| DE | 196 06 311 A1 | 8/1997 | .......... F16H/59/06 |
| DE | 196 11 431 A1 | 9/1997 | .......... F16H/59/06 |
| EP | 0 529 777 A1 | 3/1993 | .......... F16H/61/00 |
| EP | 0 785 382 A1 | 7/1997 | .......... F16H/61/38 |

* cited by examiner

*Primary Examiner*—Tan Q. Nguyen
(74) *Attorney, Agent, or Firm*—David & Bujold, P.L.L.C.

(57) ABSTRACT

In a method for controlling the multiplication for a continuously variable transmission with electrohydraulic control by means of a control loop having a linear PID controller with the specified multiplication of the variator iv_soll as command variable, the actual multiplication iv as regulating variable and the multiplication changing speed as correcting variable, the correcting variable delivered by the PID controller is limited to limiting values determined by the design for an upshift and downshift wherein said limiting values are calculated form the limits determined by construction and from the operating-point dependent limits determined by volume flow and the intersection of both admissible intervals determined by construction and by volume flow is defined as admissible multiplication changing speed range.

8 Claims, 3 Drawing Sheets

METHOD FOR DETERMINING ADJUSTING SPEEDS IN A CONTINUOUSLY VARIABLE TRANSMISSION

FIELD OF THE INVENTION

A method for calculating the constructive, cooperating-point dependent maximum and minimum adjusting speeds in a continuously variable transmission with electrohydraulic drive.

BACKGROUND OF THE INVENTION

A continuously variable transmission usually consists, among others, of a starting unit, a forward/reverse drive unit, an intermediate shaft, a differential, hydraulic and electronic control devices and a variator. The variator customarily comprises a primary and a secondary pulley also called primary and secondary side, both pulley being formed by cone pulleys disposed in pairs and being provided with a torque-transmitting belt-drive element which rotates between the two cone pulley pairs.

In a transmission of that kind the actual multiplication is defined by the running radius of the belt-drive element which in turn is function of the axial position of the cone pulleys.

Continuously variable transmission s generally have in comparison with standard mechanical transmissions one more degree of freedom determined by principle, since added to the selection of the multiplication step to be adjusted, it is here possible also to predetermine and influence the adjustment speed at which the multiplication is transmitted form one operating point to another.

In continuously variable transmissions having a continuously variable element (belt, chain) as torque-transmitting part, there results from the structural design that in the multiplication change the cone pulley pairs of primary and secondary side of the variator are alternatively and complementarily pushed apart and pushed together by corresponding control elements, which causes a change of the running radius of the continuously variable element upon the cone pulleys and thus a change of the multiplication between primary and secondary sides.

The variator usually is hydraulically controlled. The axial displacement of the cone pulleys means here a change of volume which, since the adjustment progresses controlled by force or pressure, has to be compensated in the cone pulley pair concerned by the control hydraulics via adequate changes of volume flow.

The change of volume flow to be adjusted by the electrohydraulic control depends here directly on the actual adjustment speed of the cone pulley pairs.

Since the control hydraulics as a rule is supplied via an engine-dependent pump with structurally determined maximum volume flow, there necessarily results also a constructively stationary limit for the implementable adjustment dynamics of the variator. The variator can be adjusted only as quickly as allowed by the available oil volume flow in the interplay with other regulation and control loops or consumers.

In the constructional design of the supply pump an essential part is played, together with the assurance of the necessary oil volume flow, aspects like noise and efficiency both of which as a rule act negatively as the size of the pump increases. This results in that for the constructional design of a pump a compromise is implemented between the different criteria which compromise based on the operating point and the individual criteria constitutes only a less than optimal solution.

Based on the adaptable adjustment speeds of the variator, means that there will always exist operating conditions where adjustment gradients higher than allowed by the actual availability of the oil volume flow would be theoretically possible.

Said operating conditions are specially critical for a superposed control device, since the control without the transmission medium oil has no prevalence on the behavior of the variator and thus on the multiplication adjustment. The consequence is instabilities which can produce the destruction of the mechanics of the transmission.

One other aspect is formed by the limitations on the variator determined by the design (strength of the parts, limiting values for control pressures) which, to prevent damage or even destruction of the transmission mechanics, likewise have to be taken into consideration at every moment.

A simple possible implementation would be to preset for the admissible adjustment gradient empirical limiting values which are far enough removed from the critical values. The disadvantage here is that the possible adjustment potential in this case cannot be utilized to the required extent. Besides, a generalization regarding safety in all operating conditions is hardly possible.

This invention is therefore based on the problem of indicating, departing from the cited prior art, a method for calculating and taking into consideration the constructive, operation-point dependent maximum and minimum adjusting speeds in the multiplication control of a continuously variable transmission with electrohydraulic drive.

SUMMARY OF THE INVENTION

It is accordingly proposed steadily to calculate in every operating condition, via a physical mathematical pattern, the actual limiting values for the maximum possible adjustment gradients. Here are taken into account the special marginal conditions of oil supply (volume flow limiting values) and geometric ratios on the variator determined by the design. The calculations are based on a mathematical physical pattern. According to a selection method for establishing the adjusting speed limits relevant for the superposed adjustment control, these values are used in a control loop to adjust a predetermined multiplication specified value.

Here is used a control loop structure such as described in the Applicant's DE 196 06 311 A1. Such control loop structures combine a physical-mathematically pattern-based linearization of the controlled system by a correction member with a linear proportional plus integral plus derivative (PID) controller. The correcting variable of the PID controller is directly interpreted as standard for the adjustment gradient to be set.

BRIEF DESCRIPTION OF THE DRAWINGS

The invention is described in detail below, byway of example, with reference to the enclosed drawings wherein.

DETAILED DESCRIPTION OF THE INVENTION

Figure 1:
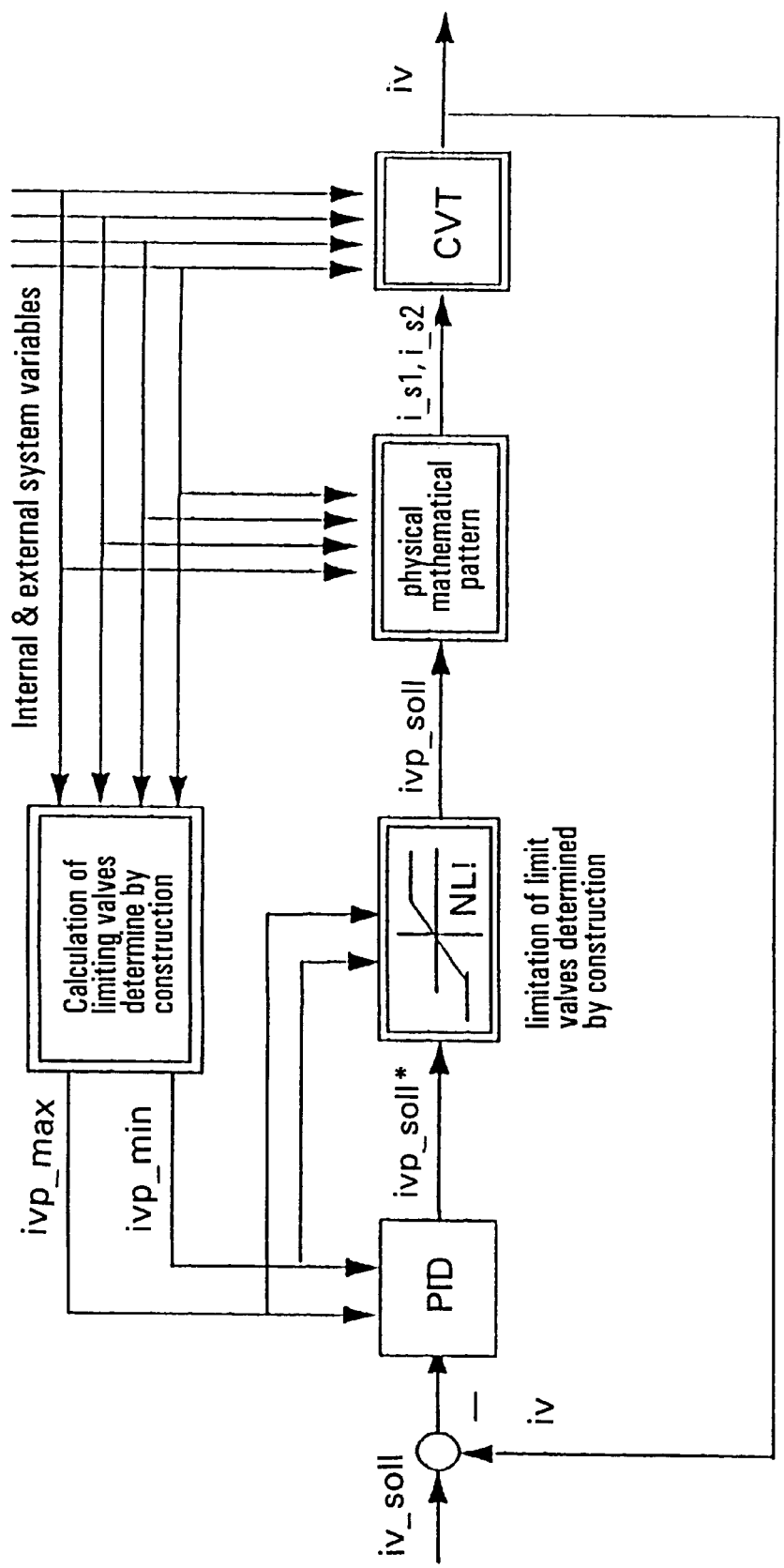
FIG. 1 is a block gear shift pattern of the control loop structure with the calculation of the limiting values determined by the design, according to the instant invention.

According to FIG. 1, the control loop structure known from the prior art with the specified multiplication iv_soll as command variable and the actual multiplication IV as regulating variable are increased by a member which limits the correcting variable adjusting speed delivered by the PID controller to limiting values determined by the design. Said limiting values determined by the design are continuously calculated according to different system parameters.

To calculate the adjusting speed limiting values, there are taken into account according to the invention both limits determined by construction (strength of parts) and volume flow limits.

To calculate the adjusting speed limiting values determined by construction, the following equations are used:

The adjustment gradient (multiplication change speed, adjusting speed) dependent on pressures (forces) introduced by the primary and secondary sides can be shown according to the prior art as physical-mathematical model equation as follows:

$$k(iv) \cdot \frac{d\,iv}{dt} = p_2 \cdot A_2 \cdot k_p k_s - p_1 \cdot A_1$$

with:

k(iv): multiplication dependent damping coefficient
  div/dt: adjustment gradient (multiplication gradient)
  $P_1$: control pressure of the primary side
  $P_2$: control pressure of the secondary side
  $A_1$: pulley surface of the primary side
  $A_2$: pulley surface of the secondary side
  $k_p k_s$: adjustment force ratio Consequently, to the adjusting speed limiting value for an upshift, applied:

$$\frac{d\,iv}{dt}\bigg|_{konstr., min} = \frac{1}{k(iv)} \cdot (p_{2,min} \cdot A_2 \cdot k_p k_s - P\_S1\_MAX \cdot A_1)$$

and for a downshift:

$$\frac{d\,iv}{dt}\bigg|_{konstr., min} = \frac{1}{k(iv)} \cdot (P\_S2\_MAX \cdot A_2 \cdot k_p k_s - p_{1,min} \cdot A_1)$$

with:

p1,min: minimum contact pressure specified value primary side
  $P_{2,min}$: minimum contact pressure specified value secondary side
  P_S1_MAX: maximum admissible pressure value primary side
  P_S2_MAX: maximum admissible pressure value secondary side there having been used for the pressures of the primary and secondary side respectively the maximum admissible pressure values P_S1_MAX and P_S2_MAX.

The minimum contact pressure minimum forces or contract pressure specified values for both sides of the variator are calculated with the aid of the following equations:

$$p_{1,min} = \frac{T_1 \cdot \cos(\alpha)}{2 \cdot \mu \cdot A_1 \cdot r_1} \cdot SF_1$$

$$p_{2,min} = \frac{T_1 \cdot \cos(\alpha)}{2 \cdot \mu \cdot A_2 \cdot r_1} \cdot SF_2 \text{ with:}$$

$P_{1,min}$: contact pressure minimum force primary side
  $P_{2,min}$: contact pressure minimum force secondary side
  $T_1$: input torque on the primary side of the variator
  $A_1$: pulley surface of the primary side
  $A_2$: pulley surface of the secondary side
  $r_1$: actual running radius primary side
  $\alpha$: pulley angle
  $\mu$: frictional value of the contact band-cone pulley
  $SF_1$: safety factor of the primary side
  $SF_2$: safety factor of the secondary side According to the invention the adjusting speed limits depending on the volume flow limits are calculated as follows:

First is calculated the oil volume flow available Q_Verstell taking into account the leakage volume flows ΣQ_Leck:

$$Q\_Verstell = Q\_pump - \Sigma Q\_Leck$$

The sum of the leakage volume flows ΣQ_Leck depends on the constructional facts and can vary accordingly. In general applies ΣQ_Leck=Q_Leck_S1+Q_Leck_S2+Q_Leck_KV+Q_Leck_WK+Q_Leck_STG+Q_Schmier, wherein the volume flow of the pump Q-pump is function of the oil temperature T_O1 and of the engine rotational speed n_Mot and is stored as characteristic field.

The leakage volume flow of the different consumers such as the primary and secondary sides of the variator respectively S1 S2, of the forward clutch KV, of the brake BR and of the converter lock-up clutch WK depend on the respectively applied pressure p_s1, p_s2, p_kv and p_wk:

$$Q\_Leck\_S1 = f(p\_S1) \rightarrow q\_leckS1 = K\_QLECKS1 * p\_s1$$

$$Q\_Leck\_S2 = f(p\_S2) \rightarrow q\_leckS2 = K\_QLECKS2 * p\_s2$$

$$Q\_Leck\_KV = f(p\_KV) \rightarrow q\_leckKV = K\_QLECKKV * p\_kv$$

$$Q\_Leck\_WK = f(p\_WK) \rightarrow q\_leckWK = K\_QLECKWK1 * p\_wk$$

Here is taken into account the fundamental dependence on the oil temperature in the parameters K_QLECK S1, K_QLECKS2, K_QLECKKV and K_QLECKWK (in the production of the data).

The leakage volume flow of the control Q_Leck_STG is stored as characteristic field:

Q_Leck_STG=f(p_H, p_S2); p_H is here the system pressure in the hydraulic control unit.

For the leakage volume flows of the lubrication Q_Schmier one constant value is assumed.

In the hydraulic control is contained a prioritization determined by the design of the control branches. In the instant case the variator (S1, S2) and the reversing set (KV, BR) have top priority. The WK and the lubrication have the second priority. Consequently, an oil deficiency in the primary branch (variator, KC, BR) is covered from the secondary branch. In this state the lubrication and WK are subordinated.

The prioritization is taken into account in the calculation of the oil amount available by testing via a multi-step inquiry whether the remaining volume flow is not equal to zero.

Departing from the already introduced volume flow balance:

Q_Verstell=Q_pump-Q_Leck_$_{S1-Q}$_Leck S2-Q_Leck_$_{KV-Q}$_Leck_WK-Q_Leck_STG-Q_Schmier it is tested according to the invention whether the required oil volume flow is available. If this condition is not met, this means that Q_Verstell is <0. In this case the term Q_Schmier is removed from the subsequent calculation and then is again tested the condition of fulfillment. In case of a repeated negative value for the variable Q_Verstell the term Q_WK is also removed from the calculation. The variator can now use for adjustment the full volume flow which otherwise flows off to the secondary circle. In case the required oil volume flow is again missing, the adjusting speed is taken down until the limiting values are not exceeded and the supply is maintained. In the extreme case an adjustment can in general be restrained, the operation interrupted, since otherwise damages can be done to the variator.

This procedure can be schematically shown as follows:

WHEN
  (Q_Verstell<0)
THEN
  Q_Verstell=Qpump-Q_Leck_S1-Q_Leck_S2-Q_Leck_KV-Q_Leck_WK-Q_Leck_STG
WHEN
  (Q_Verstell<0)
THEN
  Q_Verstell=Qpump-Q_Leck_S1-Q_Leck_S2-Q_Leck_KV-Q_Leck_STG
WHEN
  Q_Verstell<0
THEN
  Q_Verstell=0

According to the invention, the admissible adjusting speed range dependent on limits is calculated as follows:

For the maximum admissible adjusting speed direction "low" (downshift) ivpktvol_max applies:

$$ivpktvol\_max = Q\_Verstell/dVS2\_diV$$

Correspondingly to the minimum admissible adjusting speed ivpktvol_min direction "OD" (upshift) applies: ibpktvol_min=Q_Verstell/dVS1_diV.

The variables dVS1_diV and dVS2_diV describe the dynamic volume change in the variator pulleys when the multiplication is changed.

To optimize the calculation time, according to the invention in the transmission control unit are shown via characteristic lines or characteristic fields the leakage volume flows contained int eh calculation, the same as the dynamic changes in volume.

The actual adjustment limits for the superposed adjustment control are calculated from the comparison of the admissible adjusting speeds based on the limits determined by the construction with the limiting values resulting from the observation of the volume flow. The intersection of the two intervals is here defined as admissible adjusting speed range.

Figure 2:
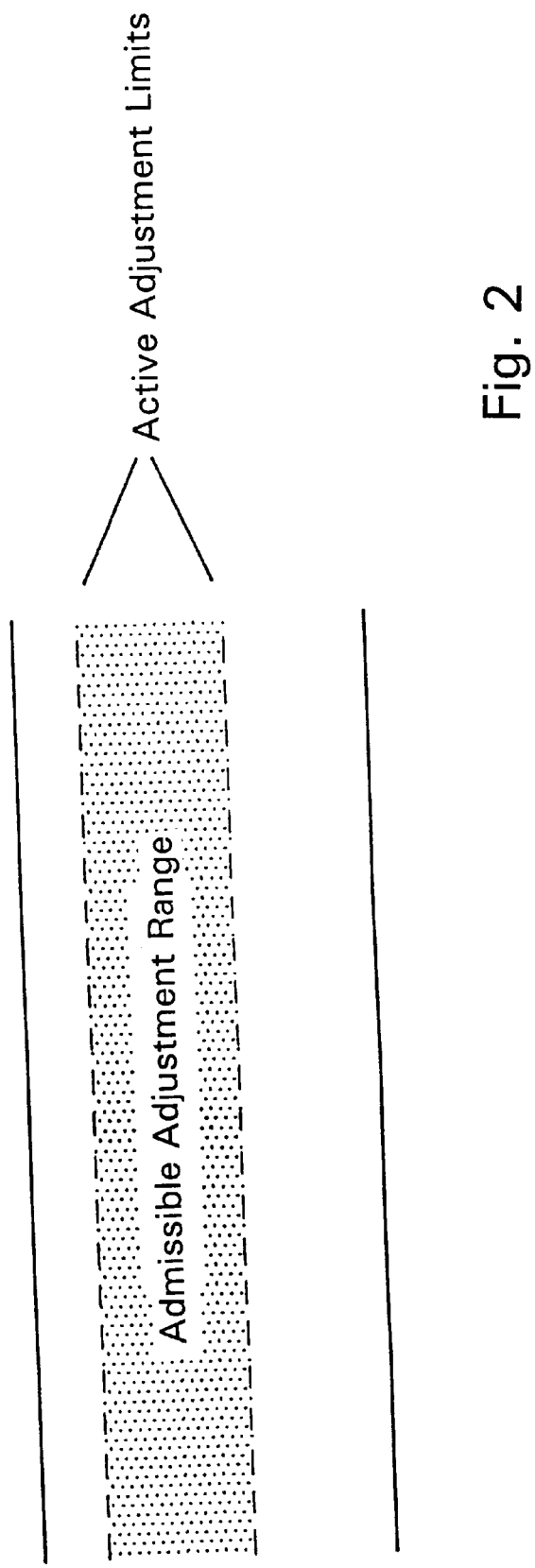
FIG. 2 is a diagram of the active adjustment limits according to the instant invention.

As it can be seen from FIG. 2, there are a total of 4 adjustment limits, the two "inner" values being identified as adjustment limits.

Since the four limiting values basically follow no established order in the value range, the selection of th admissible regulating range is evaluated by a comparison of variables. It is to be observed here that the limiting values are provided with signs.

The adjusting speed limit values that restrict the controller correcting variable serve the controller at the same time for the introduction of so-called "anti-wind steps". (Wind-up= drift of an I portion located in the controller as result of an unknown correcting variable limitation).

Figure 3:
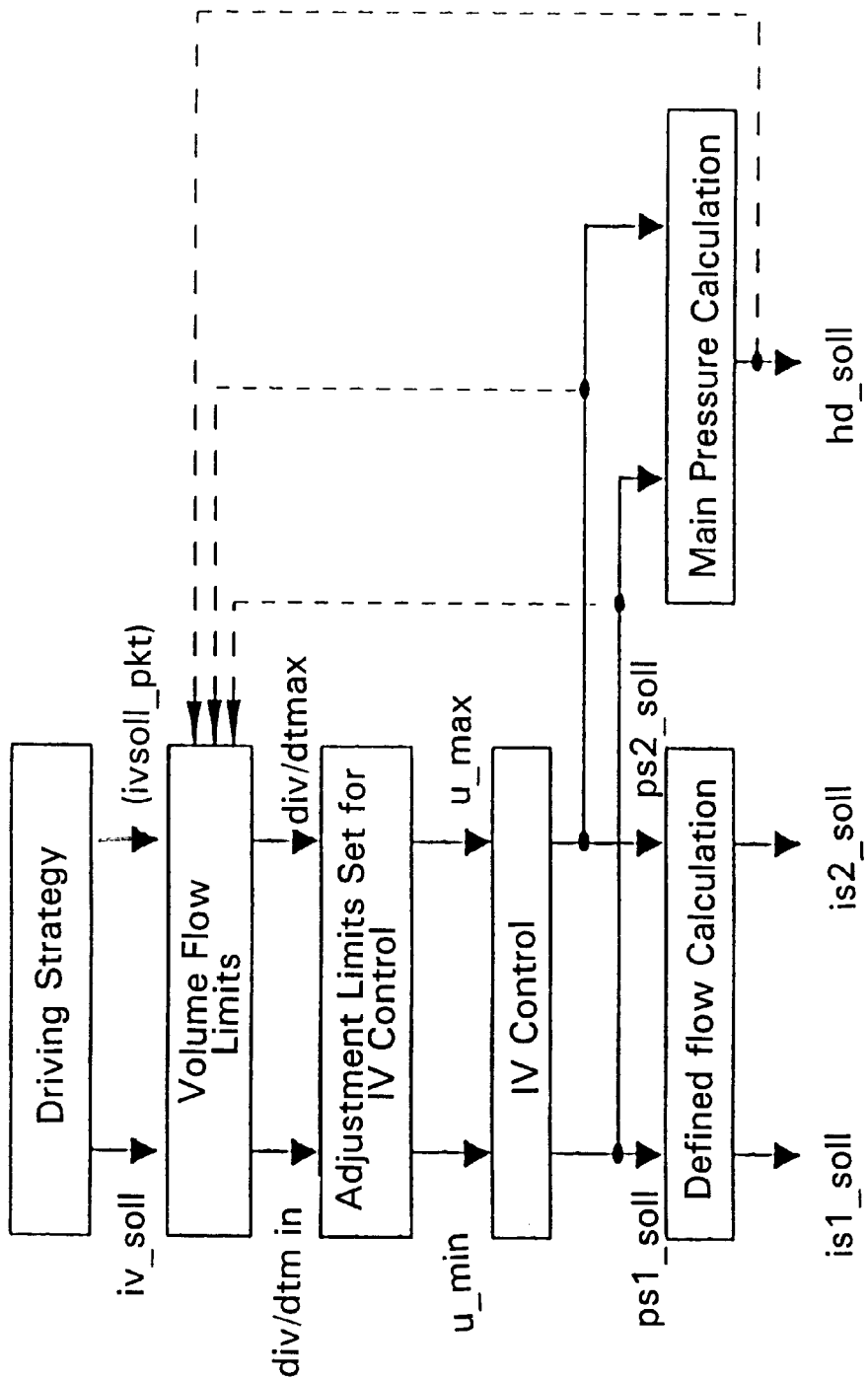
FIG. 3 is a signal flow chart of the method according to the instant invention.

The inventive procedure for calculating the constructive operating-point dependent maximum and minimum adjusting speeds is inserted according to the signal flow chart of FIG. 3 between the superposed driving strategy, which generates the values for the multiplication standard, and the subsequent multiplication controller. Eventual special functions which produce an additional change of the operating point situation can also be taken into account in accordance with their specification.

Physically observed, on account of the dependence of the adjustment limits on the actual pressure level, the calculation of the system limits had to be recursive according to the signal paths shown in dotted line in FIG. 3. (The controller correcting variables ps1_soll and ps2_soll are functions of the calculated system limits (volume flow limits, pressure limits). The calculation of the system limits itself depends in turn on the pressure values ps1_soll, ps2_soll). Since for reasons of time this mind of implementation can be carried out in the EGS only with difficulty, it is omitted.

What is claimed is:

1. A method for controlling the multiplication for a continuously variable transmission with electrohydraulic control by means of a control loop with a linear PID controller having the specified multiplication of the variator iv_soll as command variable, the actual multiplication iv as regulating variable and the multiplication changing speed as correcting variable, wherein the correcting variable delivered by the PID controller is limited to limiting values determined by construction for an upshift and a downshift, said limiting values being calculated from the limits determined by construction and from the operating-point dependent limits determined by volume flow and the intersection of the two admissible intervals determined by construction and by volume flow is defined as admissible multiplication changing speed range.

2. The method according to claim 1, wherein the multiplication changing speed limiting values determined by construction for an upshift $$\frac{d\,iv}{dt}\bigg|_{konstr., \text{min}}$$

and for a downshift $$\frac{d\,iv}{dt}\bigg|_{konstr., \text{max}}$$

are calculated by means of the following equations $$\frac{d\,iv}{dt}\bigg|_{konstr., \text{min}} = \frac{1}{k(iv)} \cdot (p_{2,\text{min}} \cdot A_2 \cdot k_p k_s - P\_S1\_MAX \cdot A_1)$$

$$\frac{d\,iv}{dt}\bigg|_{konstr., \text{max}} = \frac{1}{k(iv)} \cdot (P\_S2\_MAX \cdot A_2 \cdot k_p k_s - p_{1,\text{min}} \cdot A_1)$$

with:
  $p_{1,min}$: minimum contact pressure specified value primary side
  $p_{2,min}$: minimum contact pressure specified value secondary side
  P_S1_MAX: maximum admissible pressure value primary side P_S2_MAX: maximum admissible pressure value secondary side there having been used for the pressures of the primary and secondary side respectively the maximum admissible pressure values P_S1_MAX and P_S2_MAX and the minimum contact pressure forces or contact pressure specific values for both sides of the variator being calculated with the aid of the following equations:

$$p_{1,min} = \frac{T_1 \cdot \cos(\alpha)}{2 \cdot \mu \cdot A_1 \cdot r_1} \cdot SF_1 \text{ and}$$

$$p_{2,min} = \frac{T_1 \cdot \cos(\alpha)}{2 \cdot \mu \cdot A_2 \cdot r_1} \cdot SF_2 \text{ with:}$$

$p_{1,min}$: contact pressure minimum force primary side
$p_{2,min}$: contact pressure minimum force secondary side
$T_1$: input torque on the primary side of the variator
$A_1$: pulley surface of the primary side
$A_2$: pulley surface of the secondary side
$r_1$: actual running radius primary side
$\alpha$: pulley angle
$\mu$: frictional value of the contact band-cone pulley
$SF_1$: safety factor of the primary side
$SF_2$: safety factor of the secondary side and that the admissible adjusting speed ranges for a downshift ivpktvol_max and for an upshift ivpktvol_min are calculated according to the volume flow limits by means of the equations

*ivpktvol*_max=*Q*_Verstell/*dVS2*_*diV* and

*ibpktvol*_min=*Q*_Verstell/*dVS1*_*diV* wherein the available oil volume flow Q_Verstell is calculated from the volume flow balance Q_Verstell=Q_pump−ΣQLeck wherein ΣQ_Leck represents the sum of all leakage volume flows.

3. The method according to claim 2, wherein the sum of all leakage volume flows ΣQ_Leck is calculated by means of the following equation ΣQ_Leck=Q_Leck_S1+Q_Leck_S2+Q_Leck_KV+Q_Leck_WK+Q_Leck_STG+Q_Schmier with Q_Leck S1=leakage volume flow of the primary side of the variator
Q_Leck S2=leakage volume flow of the secondary side of the variator
Q_LeckKV=leakage volume flow of the forward clutch
Q_LeckWK=leakage volume flow of the converter lock-up clutch
Q_LeckSTG=leakage volume flow of the hydraulic control unit; and
Q_Schmier=leakage volume flow of the lubrication circuit where in applies:
Q_LeckS1=K_QLECKS1*p_s1
Q_LeckS2=K_QLECKS2*p_s2
Q_LeckKV=K_QLECKKV*p_skv
Q_LeckWK=K_QLECKWK*p_wk
Q_Schmier=constant, p_s1, p_s2, p_kv and p_wk being the pressures on the primary side, the secondary side, the forward clutch and the converter lock-up clutch and K_QLECKS1, K_QLECKS2, K_QLECKKV and K_QLECKWK representing the operating-point dependent system constants.

4. The method according to claim 3, wherein the fundamental oil temperature dependence of the parameters is taken into account in producing the data.

5. The method according to claim 3, wherein to optimate the calculation time, a leakage volume flows contained in the calculation are represented as one of characteristic lines and characteristic fields.

6. The method according to claim 2, wherein dVS1_diV and dVS2_diV are accessed via characteristic lines.

7. The method according to claim 1, wherein a predetermined prioritization of hydraulic control branches is taken into consideration during calculation of the adjustment limits.

8. The method according to claim 7, wherein the priorities are taken into account so that first tested is whether the required oil volume flow is available and when this condition has not been met, first the branch of the lubrication Q_Schmier and then the branch of the converter lock-up clutch Q_Leck_WK are removed from the calculation and the adjustment operation (in the limiting case until securing the actual multiplication) is restricted when also after removal of the terms from the calculation formula still there is not sufficient oil volume flow for the adjustment.

* * * * *